March 5, 1929.  C. F. JENKINS  1,704,360
OSCILLATOR CELL CIRCUIT
Filed Oct. 22, 1924
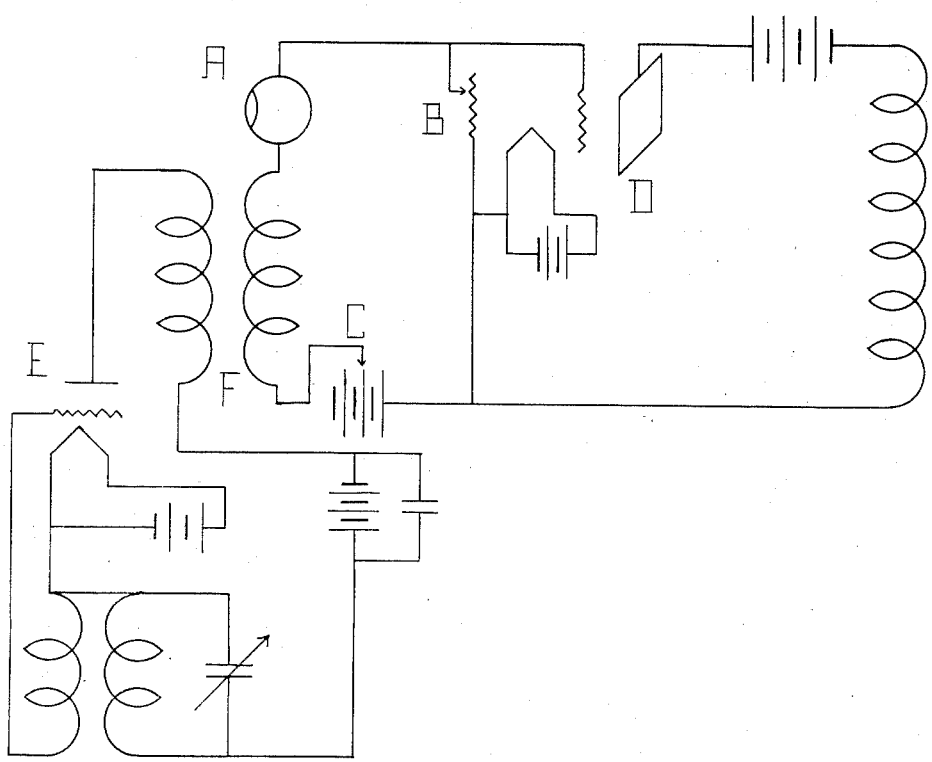

Patented Mar. 5, 1929.

1,704,360

UNITED STATES PATENT OFFICE.

CHARLES FRANCIS JENKINS, OF WASHINGTON, DISTRICT OF COLUMBIA, ASSIGNOR TO JENKINS LABORATORIES, OF WASHINGTON, DISTRICT OF COLUMBIA, A CORPORATION OF THE DISTRICT OF COLUMBIA.

OSCILLATOR CELL CIRCUIT.

Application filed October 22, 1924. Serial No. 745,213.

This invention relates to radio circuits of transmitting apparatus, and has for its principal object an association of elements such that intermittent light falling on a light-sensitive cell will pass in varying strength the current from an oscillating circuit.

With this and other objects in view, the hereinafter-described circuit is employed, illustrated in the accompanying drawing, and particularly pointed out in the claims.

In the drawing A is a light-sensitive cell; B an adjustable grid leak; and C an adjustable-voltage battery in circuit with the cell, grid leak and grid of tube D. An oscillator E is coupled to the cell circuit at F.

In operation the grid leak B is adjusted to a point where the plate current has just ceased when full light, i. e., light of a predetermined degree of intensity, is on the cell, this ascribed as the effect due to the voltage drop across said leak. When the cell is dark, i. e., not exposed to light, or when the cell is exposed to light of lesser degrees of intensity than the predetermined degree of intensity required for the current cut-off action, the potential on the grid is released and the plate current is allowed to flow. In this condition the variations in potential on the grid, induced by the oscillator through coupling F, cause a corresponding variation in the plate circuit, which may then be amplified to any desired extent.

Any means for varying the light on the cell may be employed, but as these are no part of this invention none are here shown.

What I claim, is—

1. A light controlled signalling device comprising a thermionic valve amplifier, a light sensitive cell, a conductive circuit including said cell, a resistance coupling between said circuit and the input of said valve adjusted to a value for permitting flow of plate current when the cell is dark or subjected to light of varying degrees of intensity up to a predetermined maximum degree of intensity and at such predetermined maximum degree of light intensity to cut the flow of plate current, means for biasing the grid of said amplifier, and a local source of oscillations coupled with said cell circuit.

2. A light controlled transmitting device comprising a thermionic valve, a light sensitive cell connected to the input of said valve through an adjustable resistance coupling, a local source of oscillations coupled in series with said cell, means for negatively biasing the grid of said valve through the voltage drop across said resistance, the value of the resistance being such as to prohibit the flow of effective plate current under the influence of a light impulse of a predetermined intensity on said cell and to induce the flow of plate current when the cell is dark or influenced by light impulses of degrees of intensity less than that of the predetermined intensity.

3. The method of signalling by high frequency oscillations involving the use of a thermionic valve controlled by a light sensitive cell, the step which includes maintaining the valve to a degree just below oscillation and cutting off or reducing the flow of current to the plate by the sensitizing action of light of a certain intensity upon the cell and inducing oscillations by light variations of lower degrees of intensity acting on said cell.

4. The method of signalling by variations of radio frequency oscillations including a light sensitive cell, the step which includes maintaining the system to a degree just below oscillation under a predetermined light sensitive condition of the cell and causing oscillations in accordance with relatively less light-sensitive conditions of said cell.

In testimony whereof I have affixed my signature.

CHARLES FRANCIS JENKINS.